H. S. RECTOR.
PNEUMATIC TIRE.
APPLICATION FILED OCT. 20, 1919.

1,395,770.

Patented Nov. 1, 1921.

Witness:
John Enders

Inventor:
Harlan S. Rector
by Fritz Lach
his Atty.

UNITED STATES PATENT OFFICE.

HARLAN S. RECTOR, OF CHICAGO, ILLINOIS.

PNEUMATIC TIRE.

1,395,770. Specification of Letters Patent. Patented Nov. 1, 1921.

Application filed October 20, 1919. Serial No. 331,922.

*To all whom it may concern:*

Be it known that I, HARLAN S. RECTOR, a citizen of the United States, and a resident of Chicago, in the county of Cook and State of Illinois, have invented certain new and useful Improvements in Pneumatic Tires, of which the following is a full, clear, and exact description.

The invention relates to pneumatic tires and more particularly to single tube tires. The object of the invention is to provide an improved tire of this type which is adapted to be secured to the rim without being cemented thereto and without the usual clencher grooves in the rim.

The invention consists in the several novel features hereinafter set forth and more particularly defined by claims at the conclusion hereof.

Figure 1:
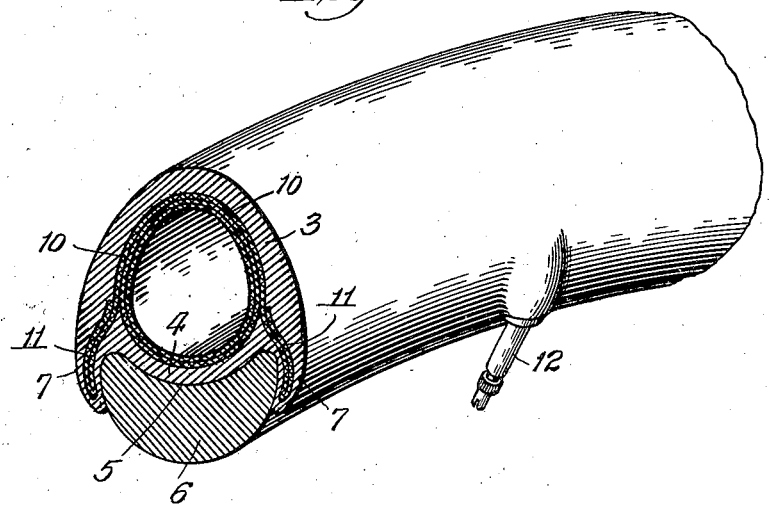
Figure 2:
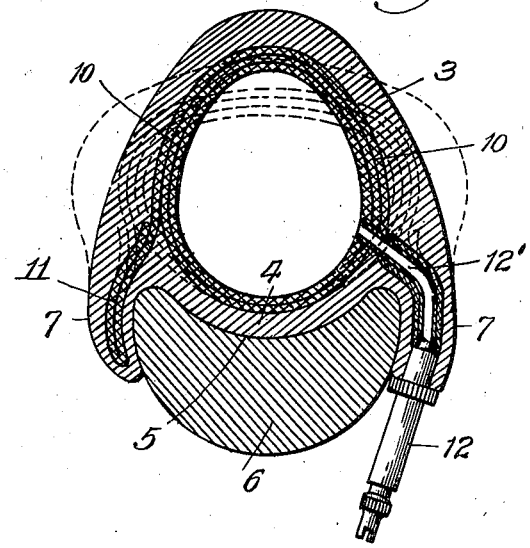

In the drawings: Figure 1 is a perspective of a portion of a pneumatic tire embodying the invention. Fig. 2 is a section through the valve connection for inflating the tire.

The improved tire comprises a tubular portion 3 which is adapted to contain air under pressure. This tube is usually built up of several tubular plies of canvas and rubber to make it of sufficient length to retain air under the usual pressure. The base 4 of the tire is curved to seat in the concave periphery 5 of the usual rim 6. The tire is formed with integral flanges 7 extending around the side edges of the rim and inwardly from and lap a portion of the inner convex face of the rim adjacent the side edges. In order to render these flanges substantially rigid and to adapt them to grip the rim without cement, they are reinforced by a ply of fabric 10 extending around the tread and side portions of the tire and doubled in the flanges as at 11. Preferably, the tire is shaped in cross section so that the tread portion will be slightly narrower than the base portion and the purpose of this is to cause the pressure upon the tread to force the side portions of the tire immediately above the rim outwardly and downwardly. This action will cause the flanges to fulcrum on the rim edges and force the flange-portions below said edges, inwardly to grip the convex face of the rim.

A valve stem 12 is secured in one of the flanges 7 and is connected to the chamber in the tube by a tube 12'. This tire connection, extending through the flange, avoids the necessity of extending the valve stem through the rim so that if there should be any creepage, the valve-stem will not be cut off.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a rim having a channeled outer periphery, of a pneumatic tire comprising a jointless single tube adapted to contain air under pressure, having its base seated in said channel and provided with integral flanges lapped around the margins of the rim and adapted to grip the rim and secure the tire by pressure against longitudinal displacement on the rim.

2. The combination with a rim having a channeled outer periphery, of a pneumatic tire comprising a tube adapted to contain air under pressure provided with integral flanges lapped around the margins of the rim, and adapted to grip the rim and secure the tire by pressure against longitudinal displacement on the rim, and reinforcement in the flanges and extended into the wall of the tube to stiffen the flanges and their connection with the tube.

3. The combination with a rim having a channeled outer periphery, of a pneumatic tire comprising a jointless single tube adapted to contain air under pressure, having its base seated in said channel and provided with integral flanges lapped around the margins of the rim and adapted to grip the rim and secure the tire by pressure against longitudinal displacement on the rim, and a valve connection extending through one of the flanges for supplying air to the tube outside of the rim.

HARLAN S. RECTOR.